(12) United States Patent
Blanvillain

(10) Patent No.: US 6,394,599 B1
(45) Date of Patent: May 28, 2002

(54) SPECTACLES WITH OPEN-SIDED ASSEMBLY MEMBERS

(76) Inventor: Eric Henri Eugene Blanvillain, La Brosse, 49460, Soulaire et Bourg (FR)

( * ) Notice: Subject to any disclaimer, the term of this patent is extended or adjusted under 35 U.S.C. 154(b) by 0 days.

(21) Appl. No.: 09/656,543

(22) Filed: Sep. 6, 2000

(30) Foreign Application Priority Data

Sep. 8, 1999 (FR) .............................................. 99 11215

(51) Int. Cl.⁷ .............................. G02C 1/02; G02C 5/14; G02C 5/02
(52) U.S. Cl. ...................... 351/110; 351/116; 351/124; 351/140
(58) Field of Search .............................. 351/86, 83, 89, 351/90, 91, 92, 93, 103, 106, 105, 107, 110, 41, 116, 111, 140

(56) References Cited

U.S. PATENT DOCUMENTS 5,467,148 A * 11/1995 Conway ....................... 351/86

6,164,775 A * 12/2000 Zider et al. ................... 351/86

FOREIGN PATENT DOCUMENTS

| DE | 94 06 002 | 4/1994 |
| FR | 406 936 | 12/1909 |
| FR | 1 051 210 | 9/1953 |
| FR | 2 766 586 | 7/1997 |

* cited by examiner

Primary Examiner—Hung Xuan Dang
(74) Attorney, Agent, or Firm—Drinker Biddle & Reath LLP

(57) ABSTRACT

Spectacles with bored frames are defined. The spectacles have lenses joined directly to the bridge and the tenon hinge of the temple by assembly points provided directly on the lenses. The assembly points, at the end of the bridge or the tenon hinge of a temple, have a tab cut out from the lens, projecting beyond the contour of the lens, and an assembly member on the end of the bridge or the tenon hinge of a temple forming a recess, open on one side, to receive the tab by means of a form fit and to be joined thereto.

12 Claims, 4 Drawing Sheets

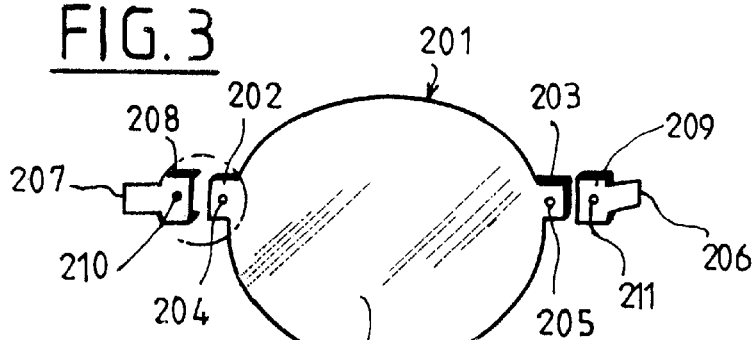
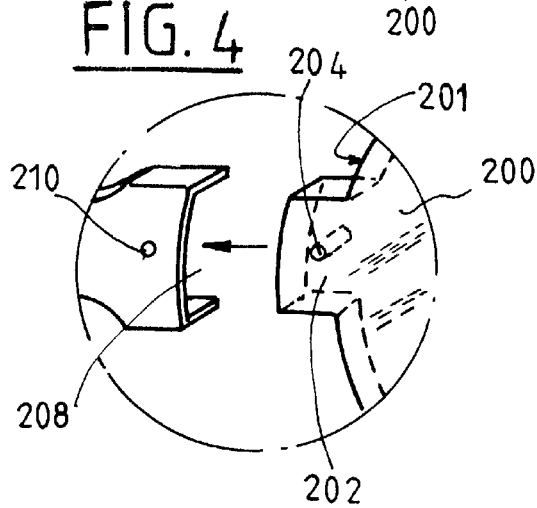
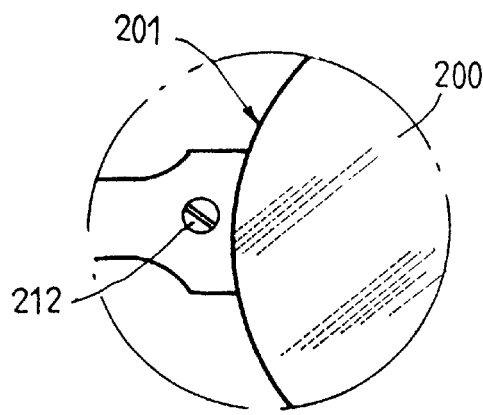

SPECTACLES WITH OPEN-SIDED ASSEMBLY MEMBERS

FIELD AND BACKGROUND OF THE INVENTION

The present invention relates to spectacles with bored frames. Spectacles of this type have lenses joined directly to the bridge and the tenon hinge of the side pieces (also known as the temples) by assembly points provided directly on the lenses.

Such spectacles are known. An example of conventional spectacles with bored frames is illustrated in FIG. 1. These spectacles have the advantage of being light and discreet. A problem with the conventional spectacles is that the user's field of vision is obstructed by the assembly points because both the bridge and the end of the tenon hinge of each side piece lie inside the contour of the lenses.

The objective of the present invention is to remedy the disadvantages of conventional spectacles with bored frames.

SUMMARY OF THE INVENTION

The spectacles according to the present invention have at least one of the assembly points, either at the end of the bridge or at the tenon hinge of a temple, formed from a tab projecting beyond the contour of the lens and an assembly member formed on the bridge or the tenon hinges of the temples. The assembly members each have a recess to receive the tab in a form fit and to be joined thereto.

Preferably, four assembly points, namely the two assembly points of the bridge and the assembly point of each temple tenon hinge, are made as described below.

Cutting out the shape of the lens to provide the tab or tabs presents no particular difficulty to one skilled in the art; and leaving tabs outside the contour of the lens imposes no constraint which might restrict the free form (i.e. the shape) which is desirable to impart to the contour of the lenses.

Each of the recesses of the assembly members, located on the bridge and on the ends of the temples, has one open side and, thus, a U-shaped cross section. Alternatively, the recess may be of a triangular, rounded or squared shape in cross section.

The U-shaped cross section, open at a side of the recess receiving the tab, regardless of whether the assembly member is at the end of the tenon hinge or at the end of the bridge, makes it possible for the recess to engage lenses of different lens thicknesses (the thicknesses of the tabs preferably being the thicknesses of the lenses before they are ground to the desired shape) without having to make the tabs of a constant and precise thickness to fit in a recess with four closed sides. The assembly is preferably joined by a threaded member and a locking nut.

BRIEF DESCRIPTION OF THE DRAWINGS

The invention will be described in more detail below with reference to the appended drawings, in which:

FIG. 3 shows a first step in making the spectacles according to the present invention, FIG. 4 shows a detail of the assembly step illustrated in FIG. 3 but on a larger scale, FIG. 5 illustrates the result of assembling a lens and an assembly member according to the present invention.

DETAILED DESCRIPTION OF THE DRAWINGS

Figure 1:
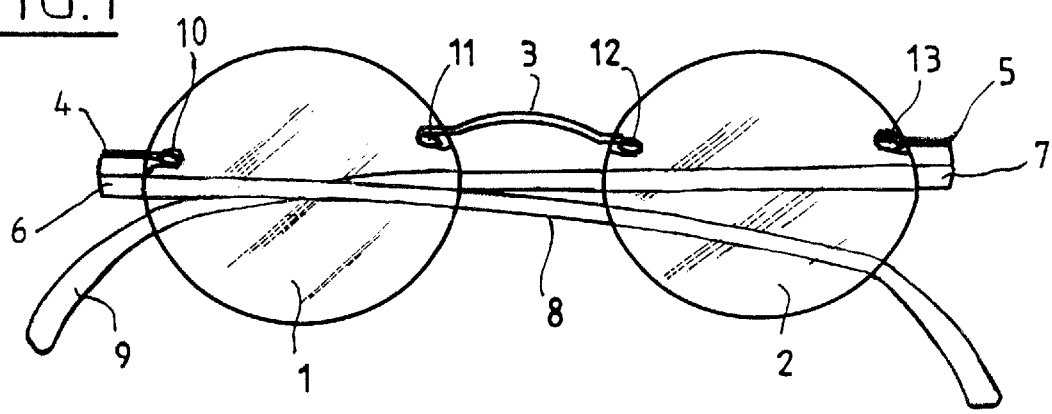
FIG. 1 is a view of a pair of spectacles made using the known technique.

The conventional spectacles with a bored frame illustrated in FIG. 1 comprise two lenses 1, 2 joined by a bridge 3 and each bearing an end 4, 5 of a tenon hinge 6, 7 of a temple 8, 9. The bridge 3, the ends 4, 5 of the tenon hinges and the lenses 1, 2 are assembled with one another at assembly points 10, 11, 12, 13 located inside the contour of the lenses 1, 2. Not only are these assembly points unaesthetic because they destroy the purity of the line of the spectacles, they also, more importantly, hamper lateral vision.

Figure 2:
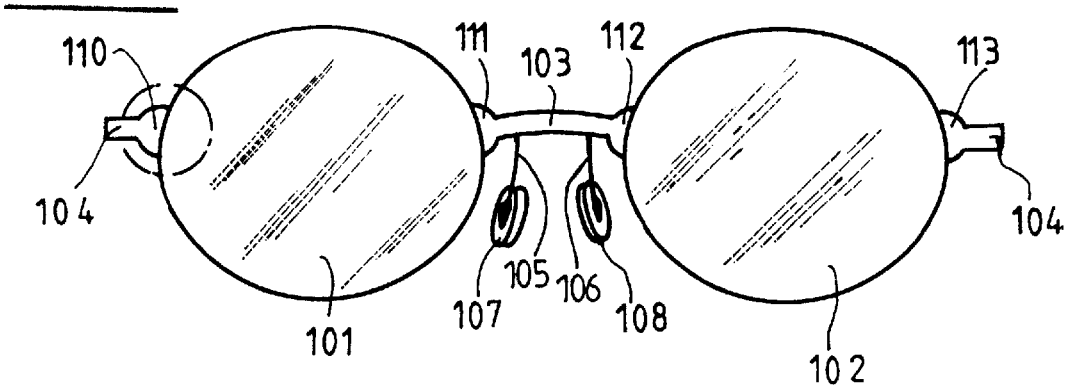
FIG. 2 is a view of a pair of spectacles according to the present invention.

An embodiment of the spectacles according to the present invention, illustrated in FIG. 2, includes lenses 101, 102, joined by a bridge 103. The bridge 103 is provided with arms 105, 106 bearing the pads 107, 108. Each lens 101, 102 is connected to a tenon hinge of a temple opposite its point of connection with the bridge.

The lenses 101, 102 are assembled with the frames (the frames being made up of the bridge 103 and the temples, including the respective tenon hinges 104, 105 of the temples) at assembly points 110, 111, 112, 113. The assembly points 110, 111, 112 and 113 are not located inside the contour of the lenses. Instead, the assembly points are located in the area conventionally occupied by the frames of known spectacles (at the ends 104 of the temples and the ends of the bridge 103).

FIGS. 3 and 4 illustrate such an assembly point 110–113 in detail. Firstly, a lens 200 is made, the contour 201 being cut to the desired shape. As seen in FIGS. 6–10, the shape of the contour can vary widely. The two tabs 202, 203 are cut as to project beyond the contour 201 of the lens 200. The tabs 202, 203 form the assembly points (shown as elements 110, 111, 112, 113 in FIG. 2) with the bridge 103 and the tenon hinge of the temples). Preferably, the tabs 202, 203 are each provided with a bore 204, 205 for receiving a fixing screw.

In another embodiment, not illustrated, a threaded pin is welded inside recesses 208, 209.

The end of the bridge 206 or the end of the tenon hinge of the temple 207 has a recess 208, 209, each of which receives a tab 202, 203. The recesses 208, 209 are also provided with a bore 210, 211 corresponding to the position of the bores 204, 205 for joining each tab 202, 203 in the recess 208, 209 by means of a screw and a locking nut, not illustrated.

FIG. 4 illustrates such an assembly point on a larger scale, specifically the point at which the tab 202 and the recess 208 are assembled. As illustrated in FIG. 4, the recess 208 has one open side and is therefore U-shaped in cross section in order to receive the tab 202. The shape of the tab 202 is adapted to match closely that of the recess 208 producing a locking fit due to the shape; the assembly is completed by a bonded joint and is preferably also screwed and locked by a screw and locking nut, not illustrated, located in the bore 210 of the recess 208 and the bore 204 of the tab 200.

The open recess 208 allows the recess 208 to receive lenses of any thickness without altering the thickness of the tab 202 or the recess 208.

FIG. 5 illustrates the assembly of FIG. 4, once completed. This view, larger in scale than that of FIG. 2 clearly shows the assembly of the lens 200 and the end of the tenon hinge of the temple 207, and the screw 212 in particular. The screw 212 is located outside the contour 201 of the lens 200 so that the assembly does not locally obstruct the field of vision.

In the example described, the recess 208 is formed inside the end of the temple 207, the wall of which is relatively slim. In fact, the shape of the recess 208 is not dependent on the external shape of the end of the temple 207 nor, more generally, the end of the tenon hinge or bridge.

Although the assembly point of the spectacles according to the present invention is preferably disposed at the two ends of the bridge and at the end of each of the tenon hinges of the temples, it is also possible to adopt an intermediate solution using a single assembly point with a tab according to the present invention and a conventional assembly point for the other part of the lens, for example the bridge 206 or the end of the temple 207 (FIG. 3).

Figure 6:
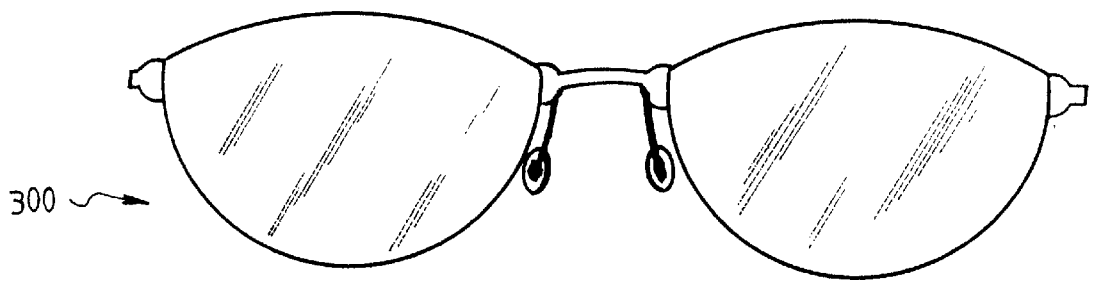
FIGS. 6 to 10 illustrate different embodiments of the spectacles according to the present invention.
Figure 7:
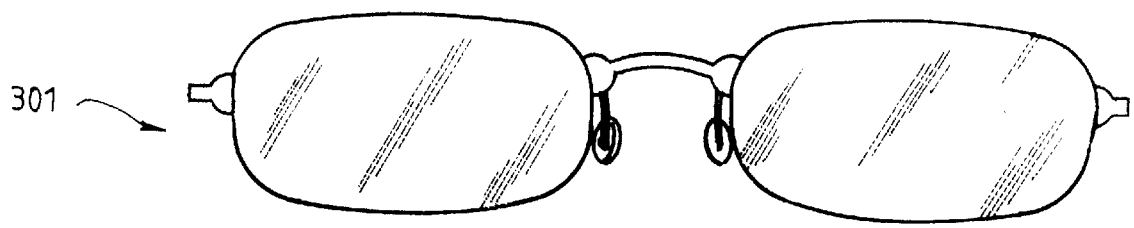

Various different embodiments of the present invention are illustrated in FIGS. 6 through 10. FIGS. 6 and 7 correspond to the embodiment of FIG. 2 except that the contour of the lenses are of a different shape. These pairs of spectacles 300, 301 will not be described in detail.

Figure 8:
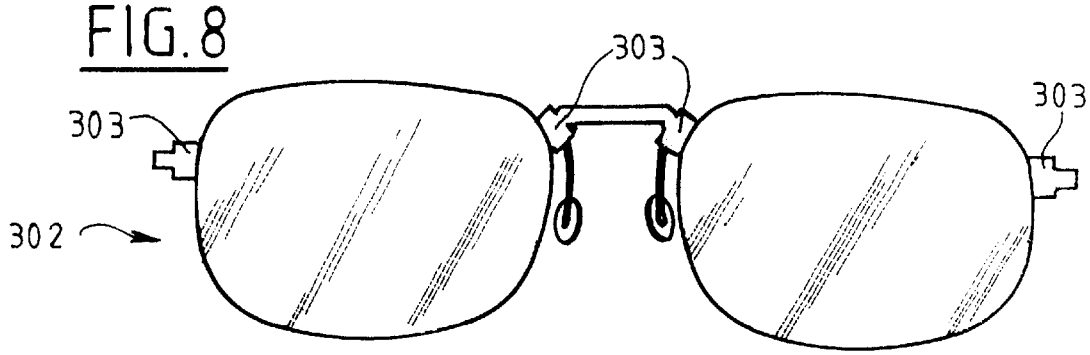

The pair of spectacles illustrated in FIG. 8 is different from the embodiment of FIG. 2 due to the positioning of the assemblies between the lens and the bridge or the tenon hinges. For this pair of spectacles 302, the recesses 303, shown by the same reference number, are squared in cross section.

Figure 9:
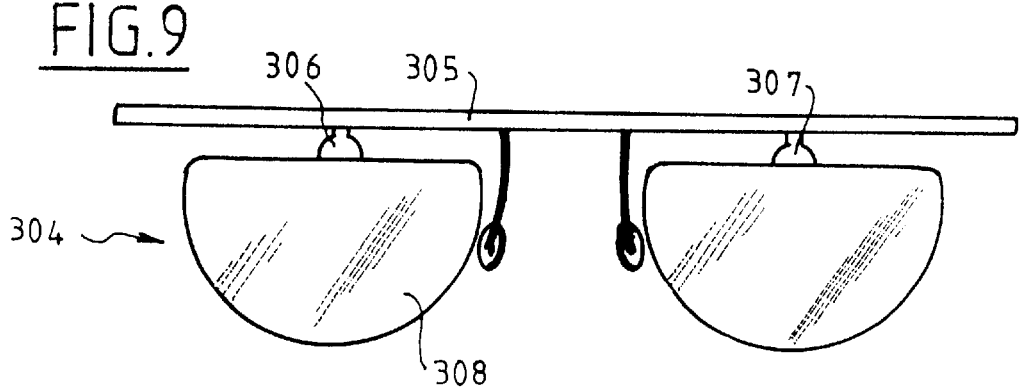

The pair of spectacles 304 illustrated in the embodiment of FIG. 9 has a cross-piece 305 bearing the recesses 306, 307, no other assembly members being provided, each of which receives the tab, not illustrated, of a lens 308.

Figure 10:
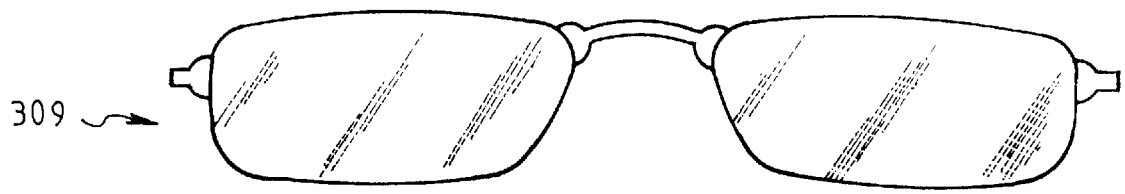

Finally, the embodiment illustrated in FIG. 10 differs, for example, from embodiment 301 shown in FIG. 7, due to the fact that the embodiment of FIG. 10, spectacles 309, does not have pads.

The frames described above may be made from different materials, such as metal, preferably titanium, plastic materials, plastic-coated materials or fibers such as carbon fibers.

Different effects may be used with the material of the frames depending on the desired appearance, combined with different colors in one or more shades.

The frame may also be decorated and may have a logo or brand name applied to it.

What is claimed is:

1. Spectacles comprising:

two lenses, each lens being formed to include at least one protruding tab extending from the contour of the lens;

a frame having a bridge and two temples;

at least one attachment point between the frame and the at least one tab of each lens, the frame having a recess at the at least one attachment point for engaging the tab, the recess being open on at least one side so as to be engageable with tabs of different thicknesses.

2. The spectacles of claim 1 wherein each lens has two protruding tabs, one for engaging a recess in one end of the bridge, the other for engaging a recess in an end of one of the temples.

3. The spectacles of claim 1 further comprising:

a threaded member;

a bore in the at least one tab of each lens;

a bore in each of the recesses of the frame;

the bores of the recesses corresponding with the bores of the tabs; and the threaded member placed through the bore of each recess and the bore of its corresponding tab, the threaded member locking the lens and frame parts together.

4. The spectacles of claim 3 further comprising a locking nut secured to the threaded member, the locking nut and threaded member locking the lens and frame parts together.

5. Spectacles with bored frames comprising:

a pair of lenses connected by a bridge, the lenses each having a contour and a protruding tab extending from the contour;

the bridge having two ends, each end having a recess for engaging one of the tabs of one of the lenses, the recesses being open on one side for receiving tabs of different thicknesses;

the protruding tab of each lens forming an assembly point with the recess of one end of the bridge; and a temple hingedly attached to each lens.

6. The spectacles of claim 5 wherein each lens has a second protruding tab extending from the contour of the lens, the second protruding tab of each lens forming an assembly point with one of the temples.

7. The spectacles of claim 5 wherein the protruding tab has a hole bored therethrough for receiving a connecting screw.

8. The spectacles of claim 5 wherein each recess has a U-shaped cross section.

9. Spectacles with bored frames comprising:

a pair of lenses connected by a bridge, the lenses each having a contour, and a protruding tab extending from the contour;

a pair of temples, each having a hinge at an end of the temple, the hinge having an assembly member with a recess, the recess being open on one side for receiving tabs of different thicknesses; and the protruding tab of each lens forming an assembly point with the recess of the assembly member.

10. The spectacles of claim 9 wherein each lens has a second protruding tab, the second protruding tab extending from the contour of each lens the second protruding tab of each lens forming an assembly point with an end of the bridge.

11. The spectacles of claim 9 wherein the protruding tab has a hole bored therethrough for receiving a threaded member.

12. The spectacles of claim 9 wherein each recess has a U-shaped cross section.

* * * * *